United States Patent
Kress et al.

(10) Patent No.: US 6,676,338 B2
(45) Date of Patent: Jan. 13, 2004

(54) TOOL FOR MAKING BORES WITH OFFSET CUTTING EDGES

(75) Inventors: Dieter Kress, Aalen (DE); Friedrich Häberle, Lauchheim (DE)

(73) Assignee: Mapal Fabrik fur Prazisionswerkzeug Dr. Kress KG (DE)

(*) Notice: Subject to any disclaimer, the term of this patent is extended or adjusted under 35 U.S.C. 154(b) by 0 days.

(21) Appl. No.: 09/991,354

(22) Filed: Nov. 19, 2001

(65) Prior Publication Data

US 2002/0076283 A1 Jun. 20, 2002

(30) Foreign Application Priority Data

Nov. 17, 2000 (DE) .......................... 100 58 226

(51) Int. Cl.$^7$ .............................. B23B 27/14; B23C 5/20
(52) U.S. Cl. ............................................. 407/35; 407/43
(58) Field of Search ............................. 407/35, 38, 43, 407/44, 56, 57, 58, 59, 63, 60, 61, 33, 37

(56) References Cited

U.S. PATENT DOCUMENTS

| | | | | |
|---|---|---|---|---|
| 3,759,625 A | * | 9/1973 | Iversen | 408/188 |
| 4,097,174 A | * | 6/1978 | Heinlein | 407/46 |
| 4,219,292 A | * | 8/1980 | Hoffmann et al. | 407/63 |
| 4,586,855 A | * | 5/1986 | Rawle | 407/55 |
| 4,740,121 A | | 4/1988 | Arnold | 51/10 |
| 4,808,044 A | * | 2/1989 | Tsujimura et al. | 407/42 |
| 4,948,305 A | * | 8/1990 | Reiterman | 408/224 |
| 5,083,887 A | * | 1/1992 | Dotany | 407/59 |
| 5,542,792 A | * | 8/1996 | Krueger et al. | 407/35 |
| 5,947,649 A | * | 9/1999 | Arai et al. | 407/34 |
| 5,984,592 A | * | 11/1999 | Harper et al. | 407/40 |

FOREIGN PATENT DOCUMENTS

| | | | |
|---|---|---|---|
| CH | 494611 | 9/1970 | |
| DE | 239965 | 10/1986 | 77/0 |

OTHER PUBLICATIONS

"Reibahlen mit Hartmetallschneiden", by Ing. H. Eberhardt, Schmalkalden, p. 16 (w/transl.).
European Search Report 01124765.7 dated Apr. 25, 2002.
"Hartbearbeitung ersetzt Schleifen" Werkzeuge WB, vol. 133, 2000, pp. 31–33, Dr.–Ing. Dieter Kress, Author.

* cited by examiner

Primary Examiner—Henry W. H. Tsai
(74) Attorney, Agent, or Firm—Ostrolenk, Faber, Gerb & Soffen, LLP

(57) ABSTRACT

A tool for machining bore surfaces having at least four cutting edges in respective pairs, one pair of cutting edges are arranged so as to be offset from one another as viewed in the axial direction of the tool, one pair may be diametrically opposed and another pair may be diametrically offset and not diametrically opposed.

25 Claims, 3 Drawing Sheets

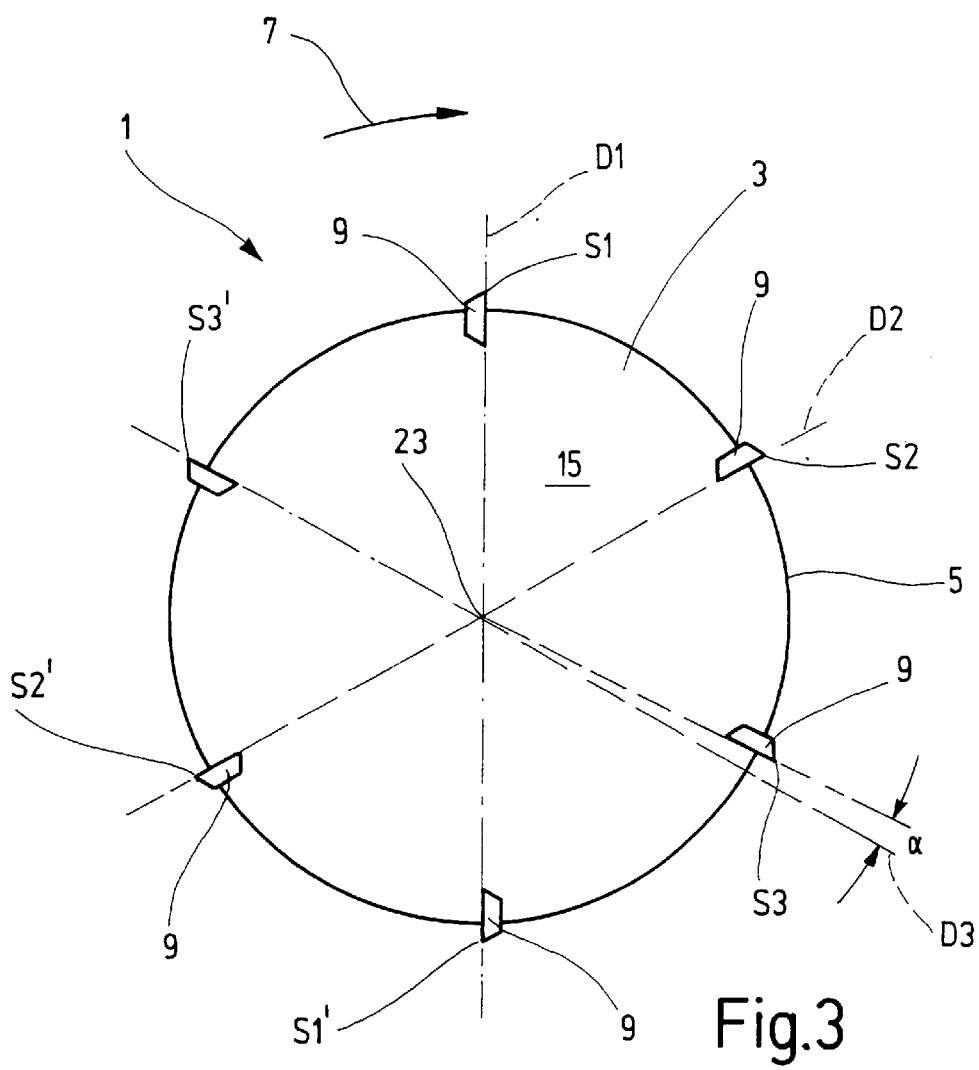
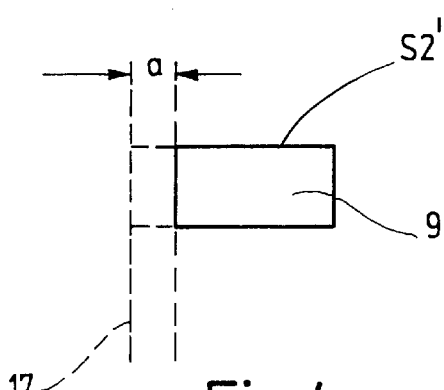
Fig.4a
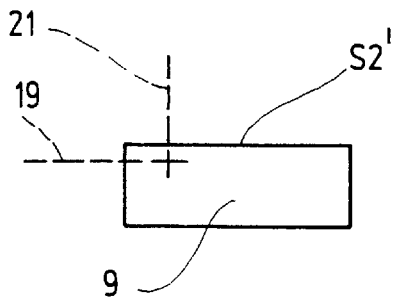
Fig.4b

TOOL FOR MAKING BORES WITH OFFSET CUTTING EDGES

BACKGROUND OF THE INVENTION

The present invention relates to a tool for machining bore surfaces and particularly to the arrangement of paired cutting edges on a cutting tool body.

Tools of this type, such as boring tools and reamers, are known. Particularly when machining bore surfaces in workpieces made of hardened steel, it has been found that the cutting edges of the tool become chipped and/or chattering occurs during the machining, so that the bore surface does not have the desired size or the desired surface quality.

SUMMARY OF THE INVENTION

It is therefore an object of the invention to provide a tool of the type mentioned at the beginning which does not have these disadvantages.

To achieve this object, a tool is proposed which includes a rotatable tool body with a plurality, and preferably at least four, cutting edges, and of the at least four cutting edges, which are arranged in pairs, one pair of cutting edges is offset in the axial direction of the tool body from the other pair.

In an especially advantageous embodiment of the tool, the first pair of cutting edges are arranged symmetrically to one another while the second pair of cutting edges are arranged asymmetrically. That means that the second pair of cutting edges are not arranged exactly diametrically opposite or, as viewed in the axial direction of the tool, are arranged so as to be offset from one another. In an arrangement having an axial offset of one pair of cutting edges or in an arrangement with cutting edges which are not exactly diametrically opposite, it has been found that chipping of the cutting edges and chattering of the tool are avoided, even when machining workpieces made of hardened steel.

In a further preferred embodiment of the tool, at least a third pair of cutting edges is provided. In a tool having at least six cutting edges, the first pair of cutting edges are arranged symmetrically to one another and the second and/or third pair of edges are arranged asymmetrically, as discussed above. This reliably avoids chipping of the cutting edges and chattering of the tool.

Other objects and features of the invention are explained below with reference to the accompanying drawings.

BRIEF DESCRIPTION OF THE DRAWINGS

FIG. 3 is a schematic plan view of the end face of a second embodiment of a tool with six cutting edges;

FIG. 4a is a side view of a first embodiment of a cutter tip, and

FIG. 4b is a side view of a second embodiment of a cutter tip.

DESCRIPTION OF PREFERRED EMBODIMENTS OF THE INVENTION

Figure 1:
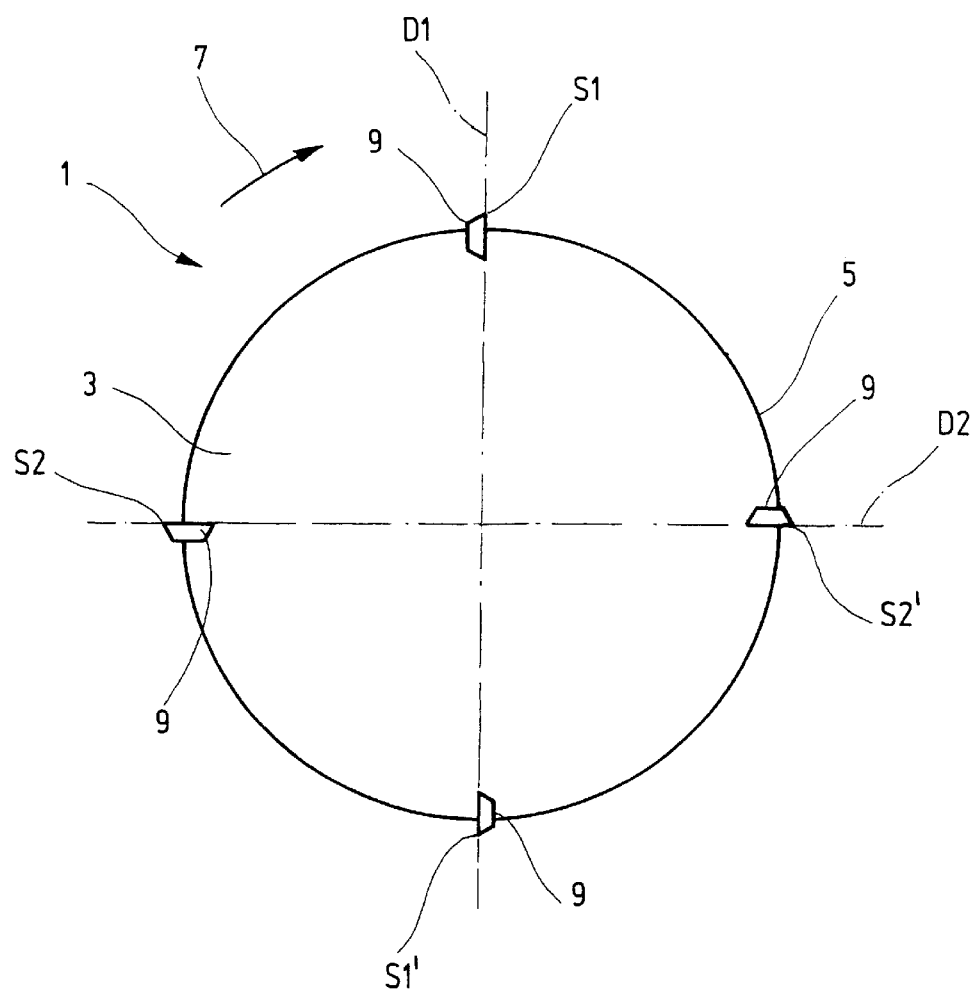
FIG. 1 is a schematic plan view of the end face of a tool having four cutting edges.

The plan view in FIG. 1 shows a tool 1 having a body 3 indicated by a circular line 5. The body 3 supports four cutting edges which are arranged in two pairs. The first pair of cutting edges S1 and S1' are shown at the top and the bottom of the tool 1. They lie on an imaginary diameter line D1, perpendicular to a second imaginary diameter line D2. The second pair of cutting edges S2 and S2' are arranged on the line D2.

During machining of an internal bore surface of a workpiece, there is relative movement between the cutting edges S1, S1', S2, S2' and the bore surface by rotating the tool 1 relative to the workpiece or by rotating the workpiece relative to the fixed tool. It is, of course, also possible for both of the tool and the workpiece to rotate relatively. There should be relative movement between the cutting edges and the bore surface. Here, it is assumed that the tool 1 rotates relative to the fixed workpiece, in the clockwise direction of arrow 7. The cutting edges S1, S1', S2 and S2', which project radially beyond the outer surface of the body 3, remove chips from the bore surface. These chips are directed out of the bore in a conventional manner. To avoid chip clogging, there may be a recess (not shown here), which acts as a chip space, in the body 3 of the tool 1 in front of each cutting edge as viewed in the direction of rotation. Since the function of such a tool is known, it is not detailed here.

The cutting edges S1, S1', S2 and S2' may also be part of the main or base body 3 of the tool 1, and the cutting edges may be produced from the solid. In the embodiment illustrated, however, each of the cutting edges is part of a cutter tip 9, which is fastened to the body 3 of the tool 1. As a rule, each cutter tip 9 is inserted into a respective groove, running essentially in the longitudinal direction of the tool 1, in the body 3. They are brazed in place there or are held by a suitable clamping device, particularly a clamping shoe. It is also possible to fasten the cutter tips directly to the body 3 by means of a screw.

For this invention, it is irrelevant whether the cutting edges are direct parts of the body 3 or are disposed on cutter tips 9, as shown in FIG. 1 and the following figures.

Figure 2:
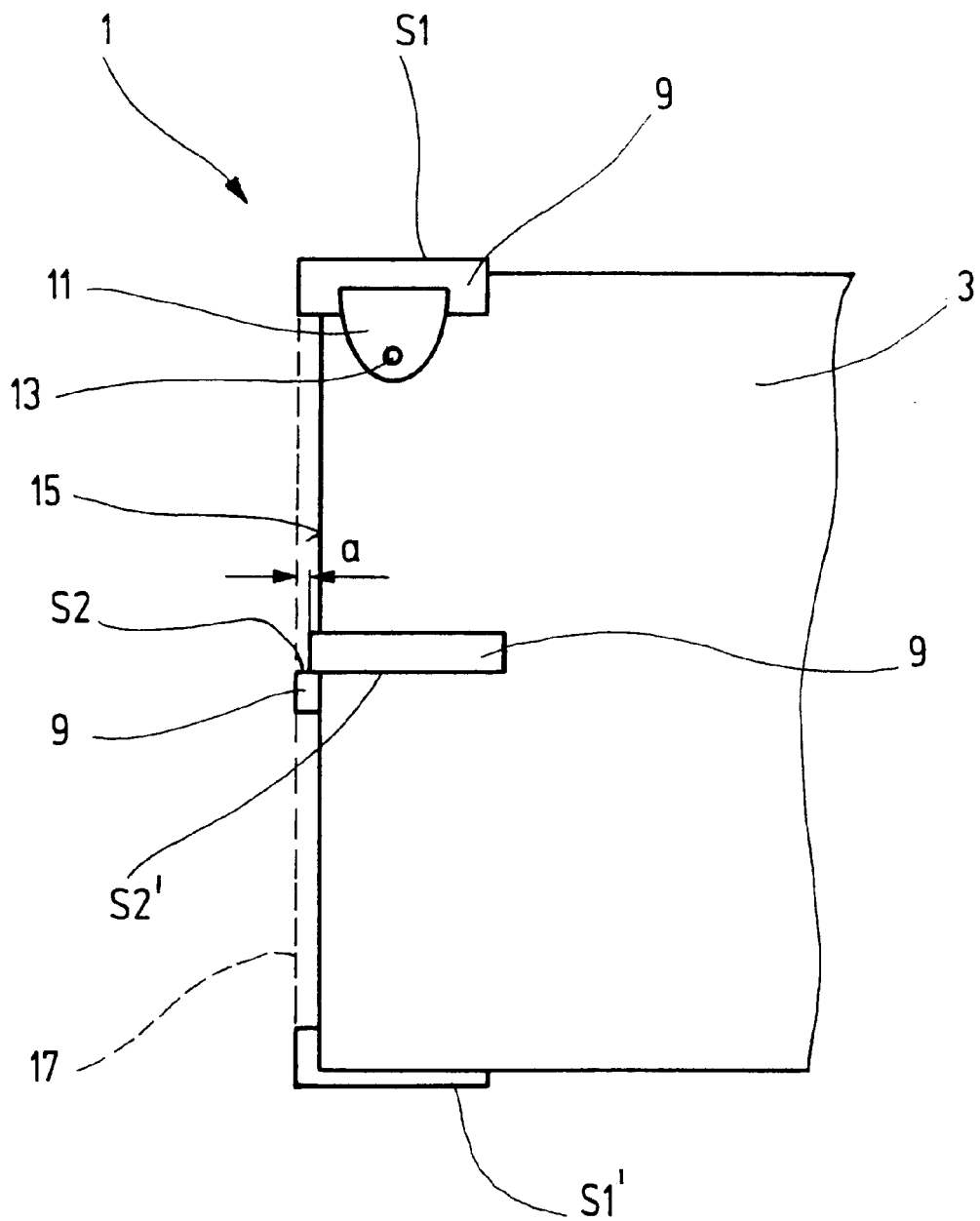
FIG. 2 is a side view of the front part of the tool shown in FIG. 1.

FIG. 2 shows a side view of the tool 1 in FIG. 1. This side view shows the top cutting edge S1 and the diametrically opposite cutting edge S1' of the first cutting-edge pair. The cutter tip 9 at the cutting edge S1 is held by a clamping device, here a clamping shoe 11 and the shoe and tip are fastened to the main body 3 of the tool 1 by a clamping screw 13. As in FIG. 1, further clamping shoes have not been shown for clarity.

FIG. 2 shows a cutter tip 9 with the cutting edge S2' of the second cutting-edge pair in plan view. Here, too, the forward part of the cutter tip 9, which projects beyond the end face 15, has the cutting edge S2. As seen here, the two cutting edges S2 and S2' lie diametrically opposite one another on the horizontal diameter. However, whereas the cutter tip 9 of the cutting edge S2 projects forward to the line 17, the cutter tip 9 of the cutting edge S2' is set back relative to this line 17. The cutter tip 9 of the cutting edge S2 therefore does not project beyond the forward end face 15 of the body 3 to the same extent as the cutter tip 9 of the cutting edge S2.

The cutter tips 9 of the cutting edges S1 and S1' both extend up to the line 17, projecting to the same extent forward beyond the end face 15. As shown in FIG. 1, they lie exactly on a diameter line D1. The two cutting edges S1 and S1' of the first cutting-edge pair therefore lie symmetrically to one another.

In contrast, although the cutting edges S2 and S2' of the second cutting-edge pair lie exactly on a diameter line D2, they project to a different extent forward beyond the end face 15 of the parent body 3 of the tool 1 and are offset from one another in the axial direction of the tool 1. The cutting edges S2 and S2' of the second cutting-edge pair are thus arranged asymmetrically.

FIG. 3 schematically shows a plan view of a second embodiment of a tool 1. The same parts have the same reference numerals as in FIGS. 1 and 2. The tool shown in FIG. 3 differs from the tool in FIG. 1 by including three cutting-edge pairs S1 and S1', S2 and S2', and S3 and S3'. The first cutting-edge pair S1, S1' lie on a first diameter line D1. The second cutting-edge pair S2, S2' lie on a second diameter line D2. In the third cutting-edge pair S3 and S3', although the cutting edge S3' lies on a third diameter line D3, the cutting edge S3 is angularly offset from the diameter line D3 by an angle $\alpha$, here trailing the diameter line D3 in the direction of rotation of the tool 1 shown by the arrow 7. However, the cutting edge S3 may lead the diameter line D3 virtually in mirror symmetry to FIG. 3.

The embodiment of the tool 1 in FIG. 3, places the first cutting-edge pair S1 and S1' and the second cutting edge pair S2 and S2' symmetrically on respective diameter lines D1, D2 and, as viewed in the axial direction of the tool 1, and they project to the same extent beyond the end face 15 of the body 3. Here only the third cutting-edge pair S3 and S3' is arranged asymmetrically, with the cutting edge S3 not exactly on the same diameter line D3 as the cutting edge S3'.

However, the second cutting-edge pair S2, S2' may also be asymmetrically, arranged either by being offset in the axial direction as in FIG. 2, or by one of the cutting edges, of this pair too, not being arranged on the diameter line D2, unlike as shown in FIG. 3.

In addition, the asymmetries in FIGS. 2 and 3 may be combined such that, for example, in the exemplary embodiment of FIG. 3, the second cutting-edge pair S2 and S2' is offset in the axial direction, as in FIG. 2, and the third cutting-edge pair S3 and S3' is offset from the diameter line D3. Finally, the asymmetry may be from one cutting-edge pair being both axially offset and offset relative to an associated diameter line.

In FIG. 2, it has been assumed that the cutter tip 9 which is assigned to the cutting edge S2' has been displaced to the right in FIG. 2 in the axial direction in the body 3 of the tool 1. However, it is alternatively possible to remove the front end region of the cutter tip, that portion of the cutter tip which projects forward beyond the end face 15. This possibility is shown in FIG. 4a, which shows a cutter tip 9 which, for example, is assigned to the cutting edge S2'. The cutting edge S2' is set back relative to the imaginary line 17, also shown in FIG. 2, by a portion of the cutting edge being ground down, so that the cutting edge S2' is shortened by the distance a.

A different embodiment of the cutter tip 9 with the cutting edge S2' is shown in FIG. 4b. Broken lines 19 and 21 indicate that the left-hand top corner of the cutter tip 9 may be removed, which likewise shortens the cutting edge S2' in the axial direction by the distance a.

Axial asymmetry of two cutting edges of a cutting-edge pair can therefore be realized in various ways:

When a cutting edge is part of the main body 3 of a tool 1, material can be removed from the body 3 in the region of the corresponding cutting edge, for example in the region of the cutting edge S2', in a similar manner as shown in FIG. 4a. However, it is also possible to remove part of the cutting edge, as shown in FIG. 4b.

When the cutting edges are provided by a cutter tip 9, axial offset of the corresponding cutting edge can be produced by moving the cutter tip in the main body so as to be offset in the axial direction, so that cutting edge no longer projects forward beyond the end face 15 of the body 3 to the same extent as the other cutting edges, as explained with reference to FIG. 2. This offsetting of the cutter tip is possible when the cutter tip is brazed in place, or is clamped in place on the main body 3 by a clamping shoe 11.

Finally, with reference to FIGS. 4a and 4b, when providing a cutting edge using a cutter tip 9, it is possible to displace the active cutting edge of the cutter tip 9 by removing material from the tip in the axial direction. Either the entire forward end of the cutter tip may be ground down, as in FIG. 4a, or only a small portion of the cutter tip lying in the region of the cutting edge may be ground down, as in FIG. 4b.

To achieve asymmetry of the cutting edges of a cutting-edge pair as explained with reference to FIG. 2, displacement of the associated cutter tip by a distance a is possible. However, the asymmetry can also be achieved by a grinding operation, in which the cutting edge is shortened by the distance a (see FIGS. 4a, 4b). The axial asymmetry, that is the value a, may be selected to be within the range of $0.5/10$ mm to $8/10$ mm. An axial offset a of $1/10$ mm to $5/10$ mm is preferably selected. However, an axial offset a of about $2/10$ mm has proved especially successful.

In the asymmetry by displacement of one cutting edge of a cutting-edge pair relative to an associated diameter line, as in FIG. 3, an acute angle $\alpha$ measured from the center 23 of the tool 1 is selected to be within a range of 0.5° to 10°, and preferably is from 2° to 7°. An offset by the angle $\alpha$ which is about 5° has proven especially successful.

Asymmetry by axial offset of the cutting edges of a cutting-edge pair may also be produced subsequently in existing tools. It is thus possible to avoid the chipping of cutting edges and chattering of the tool even in existing tools.

It has been found that disadvantages in known tools and when machining workpieces made of hardened steel, can be avoided in a simple manner using cutting tools having their cutting edges arranged in pairs, and particularly by providing asymmetry of at least one cutting-edge pair. As was explained with reference to the tool in FIG. 3, more than one cutting-edge pair may be arranged asymmetrically. It is conceivable to realize the asymmetry not by an angular offset but by an axial offset in one and the same cutting-edge pair. Finally, it may be pointed out that the asymmetry described here may also be realized in tools which have more than six cutting edges.

The tools hereof may also be provided with guide strips, which are inserted into the main body 3 of the tool 1 and extend in the axial direction and are preferably longer axially than the cutting edges described above. A guide strip may be provided for each cutting edge or for only some of them. In addition, the guide strips may be arranged symmetrically to one another and/or some may be arranged asymmetrically to one another in the sense described here.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tool for machining a bore surface, comprising:
   a main tool body having an axis, and the body being rotatable relative to a workpiece in which a bore with the bore surface to be machined is located; the body having a forward end with an end face, a forward region back from the forward end thereof, and the body having a periphery;

at least two pairs of cutting edges supported on the body at the forward region and at spaced locations around the periphery of the body and arranged so that the cutting edges project forward beyond the end face of the body; and one of the cutting edges of one of the pairs is offset from the other cutting edge of the one pair in the axial direction of the axis of the tool body.

2. The tool of claim 1, wherein a first one of the pairs of the cutting edges are arranged diametrically opposite on a first diameter on the forward end region around the periphery of the body.

3. The tool of claim 2, wherein a second one of the pairs of the cutting edges are diametrically opposite on a different second diameter on the forward end region around the periphery of the body.

4. The tool of claim 2, wherein the first pair of cutting edges are also arranged at the same location axially along the forward end region of the tool and are not axially offset.

5. The tool of claim 2, wherein a second one of the pairs of the cutting edges are not diametrically opposite around the periphery of the body.

6. The tool of claim 5, wherein the second pair of cutting edges are axially offset from one another axially along the forward end region of the tool.

7. The tool of claim 1, further comprising a third one of the pairs of cutting edges at the forward end region of the body and angularly offset around the periphery of the body from the first and second cutting edges.

8. The tool of claim 7, wherein the third pair of cutting edges are not arranged diametrically opposite around the tool body.

9. The tool of claim 8, wherein the third pair of cutting edges are arranged on the forward end region of the body axially offset from one another in the axial direction of the tool.

10. The tool of claim 7, wherein the third pair of cutting edges are arranged on the forward end region of the body axially offset from one another in the axial direction of the tool.

11. The tool of claim 5, wherein one of the second pair of cutting edges is offset from an imaginary diameter line on which the other of the second pair of cutting edges is located by an angle of 0.5° to 10°.

12. The tool of claim 5, wherein one of the second pair of cutting edges is offset from an imaginary diameter line on which the other of the second pair of cutting edges is located by an angle of 2° to 7°.

13. The tool of claim 5, wherein one of the second pair of cutting edges is offset from an imaginary diameter line on which the other of the second pair of cutting edges is located by an angle of about 5°.

14. The tool of claim 8, wherein one of the third pair of cutting edges is offset from an imaginary diameter line on which the other of the third pair of cutting edges is located by an angle of 0.5° to 10°.

15. The tool of claim 6, wherein one of the second pair of cutting edges is axially offset with respect to the other of the second pair of cutting edges by $0.5/10$ mm to $8/10$ mm.

16. The tool of claim 6, wherein one of the second pair of cutting edges is axially offset with respect to the other of the second pair of cutting edges by $1/10$ mm to $5/10$ mm.

17. The tool of claim 6, wherein one of the second pair of cutting edges is axially offset with respect to the other of the second pair of cutting edges by about $2/10$ mm.

18. The tool of claim 9, wherein one of the second pair of cutting edges is axially offset with respect to the other of the second pair of cutting edges by about $0.5/10$ mm to $8/10$ mm.

19. The tool of claim 1, wherein the cutting edges comprise cutter tips insertable into the main body of the tool.

20. The tool of claim 19, wherein the cutter tips are brazed in place in the main body.

21. The tool of claim 19, wherein the cutter tips are clamped in place in the main body.

22. The tool of claim 6, wherein the axial offset of the one of the second pair of cutting edges is attained by grinding down one of the cutting edges of the second pair.

23. A tool for machining a bore surface, comprising:

a main tool body and the body being rotatable relative to a workpiece in which a bore with the bore surface to be machined is located; the body having a forward end with an end face, a forward end region back from the forward end thereof, and the body having a periphery;

at least two pairs of cutting edges supported on the body at the forward end region and at spaced locations around the periphery of the body and arranged so that the cutting edges project forward beyond the end face of the body; and a first pair of the cutting edges is arranged diametrically opposite at the forward end region of the periphery on the body and a second pair of the cutting edges are not arranged diametrically opposite at the forward end region at the periphery on the body.

24. The tool of claim 23, further comprising a third one of the pairs of cutting edges spaced apart from each other and from the other cutting edges around the periphery of the body.

25. The tool of claim 23, wherein the cutting edges of at least one of the pairs are arranged on the body so as to be axially offset from each other along the axial direction of the tool.

* * * * *